United States Patent [19]

Bhatti et al.

[11] Patent Number: 4,516,995
[45] Date of Patent: May 14, 1985

[54] APPARATUS FOR FORMING GLASS FIBERS

[75] Inventors: Mohinder S. Bhatti, Granville; Thomas J. Porzio; Monte L. Nagy, both of Newark, all of Ohio

[73] Assignee: Owens-Corning Fiberglas Corporation, Toledo, Ohio

[21] Appl. No.: 632,762

[22] Filed: Jul. 20, 1984

[51] Int. Cl.³ .............................................. C03B 37/09
[52] U.S. Cl. ................................................ 65/1; 65/2; 65/374.12; 65/DIG. 4
[58] Field of Search .......... 339/278 C, 273 F, 273 R; 65/1, 2, DIG. 4, 374.12

[56] References Cited

U.S. PATENT DOCUMENTS

| | | | |
|---|---|---|---|
| 2,261,412 | 11/1941 | Reeve | 339/278 C X |
| 2,726,375 | 12/1955 | Gordon | 339/273 R X |
| 2,903,671 | 9/1959 | Dreher et al. | 339/273 F X |
| 4,272,271 | 6/1981 | Thompson | 65/1 |
| 4,285,711 | 8/1981 | Willis | 65/1 |
| 4,441,904 | 4/1984 | Bhatti | 65/1 |

FOREIGN PATENT DOCUMENTS

| | | |
|---|---|---|
| 630091 | 5/1936 | Fed. Rep. of Germany ... 339/273 R |
| 720500 | 5/1942 | Fed. Rep. of Germany ... 339/278 C |
| 2034536 | 6/1980 | United Kingdom ........... 339/278 C |

Primary Examiner—Robert Lindsay
Attorney, Agent, or Firm—Ronald C. Hudgens; Robert F. Rywalski; Greg Dziegielewski

[57] ABSTRACT

A laminated article for use in high temperature, oxidizing environments is provided wherein a refractory metal substrate is mechanically interlocked and diffusion bonded to precious metal components.

8 Claims, 9 Drawing Figures

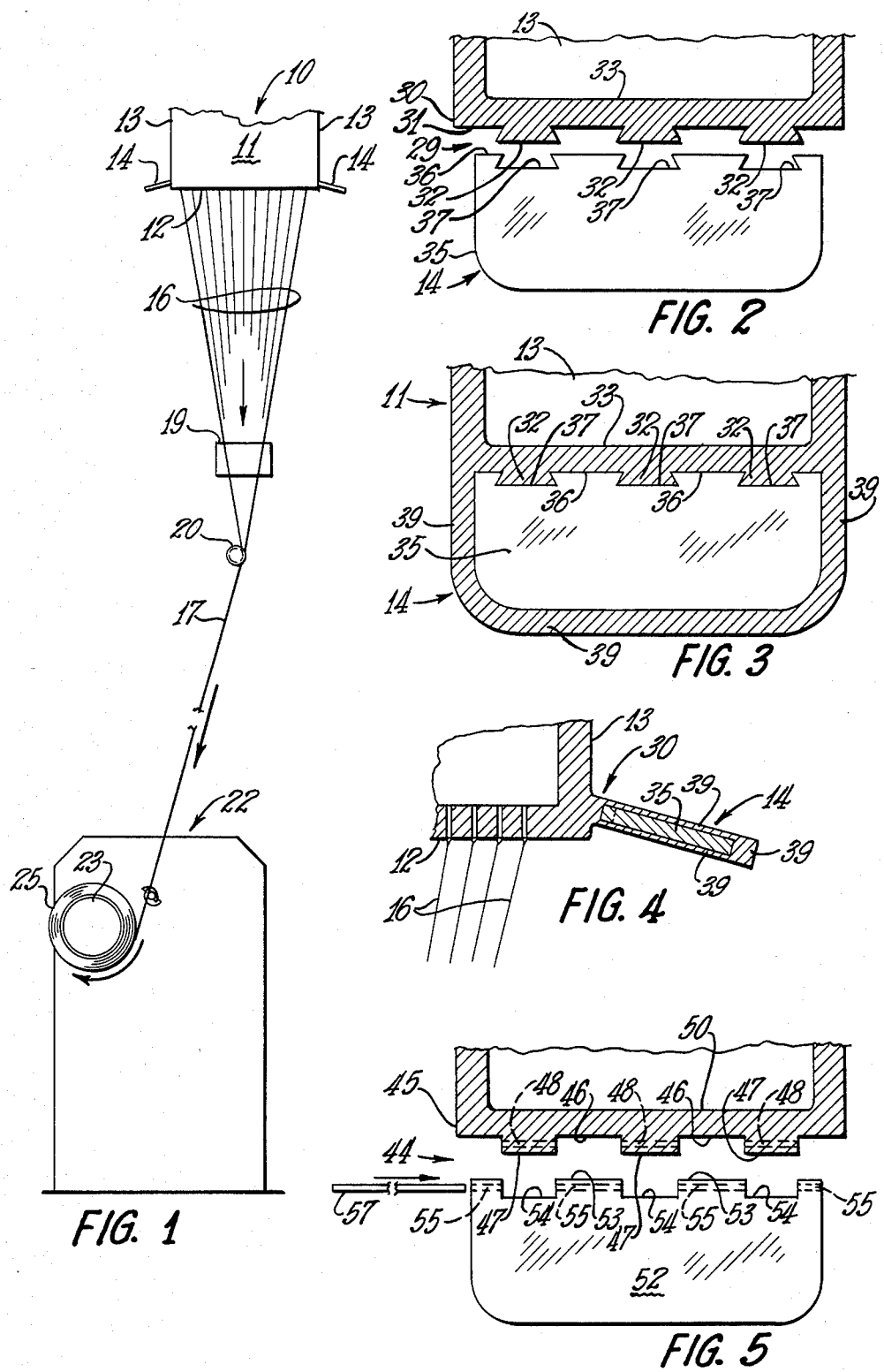

APPARATUS FOR FORMING GLASS FIBERS

TECHNICAL FIELD

The invention disclosed herein relates to a glass fiber forming feeder having a laminated ear or electrical terminal wherein components within the laminate are mechanically interlocked in addition to being diffusion bonded to each other.

BACKGROUND

Generally, feeders for flowing streams of molten glass have been made from precious metals and alloys of precious metals. Recently, specially processed laminates of refractory metals sheathed in precious metals have been developed and utilized in fabricating such feeders. For example, see U.S. Pat. No. 4,342,577; 4,402,718; 4,404,009 and 4,441,904.

In addition to high temperature, oxidizing environments, various sections of the feeders encounter other types of demanding situations.

For example, the ear or terminal, which projects outwardly from the body of the feeder or bushing and is adapted to receive electrical power from power supply lines clamped or bolted thereto, generally receives combined normal and sheer stresses due to the weight of the electrical connections attached thereto. Further, the ears or terminals are even more stressed as the connections are being bolted to the terminals due to the torque applied to the fasteners.

In some instances, such additionl stresses may tend to delaminate the refractory metal core from its precious metal frame along the edge thereof.

The present invention provides for a mechanical interlocking or interengagement between the refractory metal and the precious metal at highly stressed regions.

DISCLOSURE OF THE INVENTION

This invention pertains to apparatus for forming glass fiber forming feeders specified sections of the laminates utilized in the feeder are mechanically interlocked in addition to being diffusion bonded by hot isostatic pressing.

BRIEF DESCRIPTION OF THE DRAWINGS

FIG. 1 is a semi-schematic front view of a textile fiber forming position.

FIG. 2 is an exploded view of some of the components employed in fabricating the terminal of the feeder according to the principles of this invention.

FIG. 3 is a plan view illustrating those components as fabricated into a terminal extending from the feeder according to the principles of this invention.

FIG. 4 is an enlarged view of the terminal portion of the feeder shown in FIGS. 1 and 3.

FIG. 5 is an exploded view of an alternative embodiment of the mechanical interlock system according to the principles of this invention.

BEST MODE OF CARRYING OUT THE INVENTION

Figure 6:
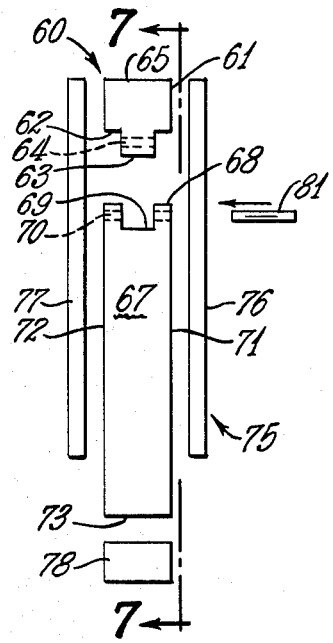
FIG. 6 is an exploded view of another embodiment of the present invention.

As shown in FIG. 1, feeder 10 is comprised of a body 11 having an orificed discharge or bottom wall 12. Body 11 may also include side walls 13. As shown, terminals 14 extend outwardly and downwardly from a point of attachment along a horizontal line on each side wall 13. It is to be understood, however, that the terminals 14 may be attached directly to discharge wall 12. Further, the terminals 14 may be oriented horizontally, vertically or at some other angled orientation with regard to body 11 according to the principles of this invention.

During operation, a plurality of streams of molten glass flow through orifices in discharge wall 12 and are drawn into filaments 16 through the action of winder 22. Filaments 16 are gathered into strands 17 at gathering means or shoe 20. Intermediate gathering shoe 20 and feeder 10, size applicator means 19 supplies a protective, lubricious coating or sizing material as is known in the art. Strand 17 is wound into a package 25 upon collet 23 of winder 22 as is known in the art.

Historically, terminals or ears 14 are plate-like components that are connected to the electrical power supply lines by which body 11 is resistively heated. The power supply lines (not shown) may be clamped or joined to the terminals 14 by conventional attachment means (not shown) as is well known in the art. According to the principles of this invention, terminals 14 are comprised of a laminate of a refractory metal core and a precious metal sheath wherein predetermined regions of the precious metal and refractory metal are mechanically interlocked in addition to being diffusion bonded by hot isostatic pressing.

FIGS. 2, 3 and 4 show a "dovetailed" type assembly 29 employed in fabricating terminals 14 which are attached to feeder 10.

In part, dovetailed assembly 29 is comprised of a precious metal connector section 30 having an articulated edge portion 31 and an attachment edge 33 opposite articulated edge 31. Articulated edge portion 31 includes a plurality of undercut or mitered tabs 32 which are adapted to mechanically interlock with the mitered slots 37 of articulated edge portion 36 of the refractory metal core 35. As shown in FIGS. 3 and 4, attachment edge 33 of precious metal connector section 30 is joined to sidewall 13 by any suitable means, such as welding, to provide a sound structural and electrical connection therebetween.

As shown, precious metal sheath 39 extends around refractory metal core 35 and is in contact with connector section 30 to protectively seal the refractory metal core therein.

Refractory metal core 35, precious metal connector section 30 and sheath 39 are intimately bonded together by means of hot isostatic pressing, preferably according to the principles set forth in the aforementioned patents, for example, U.S. Pat. No. 4,342,577, which are incorporated herein by reference.

The articulated design of edge portions 31 and 36 provide mechanical interlocking or interengagement therebetween to establish as "normal" stresses what would otherwise be "sheer" stresses if edges 31 and 36 were merely flat and butted together. In other words, the articulated portions provide "contact surfaces" between the refractory metal and precious metal perpendicular to the line of action of the force, such as torque, applied to the terminal.

Preferably, the refractory metal core or layer is selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been employed as the refractory metal core according to the principles of this invention. Preferably, the precious metals are selected from a group consisting of platinum (Pt), palladium (Pd), iridium (Ir), osmium (Os), rhodium (Rh), ruthenium (Ru) and alloys based on such metals. Included in the platinum alloys are H alloy and J alloy which are alloys of platinum and rhodium of about 90%/10% and 75%/25% composition, respectively.

As disclosed in the aforementioned patents, care should be taken in preparation of the surfaces of the core and precious metal parts to ensure a good bond therebetween. Simply stated, the connector section 30 and sheath 39 are formed to closely conform to the exterior of core 35, with the surfaces thereof being appropriately clean to promote a good metallurgical or diffusion bond therebetween. The core and connector section are enclosed within the sheath to form a prelaminate unit having at least one seam thereof open to the atmosphere to facilitate "out gassing". Then the prelaminate unit is heated in a vacuum to "out gas" the unit. Subsequent to the out gassing, the open seam of the unit is welded or sealed under a vacuum whereupon the unit is ready to be hot isostatically pressed to form the laminated terminal according to the principles of this invention. Of course, the precious metal connector section 30 and sheath 39 should be oxygen impervious to prevent the oxidation of the refractory metal core at elevated temperatures.

As shown in FIG. 5, the assembly 44 of precious metal connector section 45 and refractory metal core section 52 is of the "finger joint" type. As such, connector section 45 has an articulated edge portion 46 and an attachment edge 50 located on the opposite side thereof. Articulated edge 46 is comprised of a plurality of squared or rectangular tabs 47 having a plurality of coaxial bores 48 extending along the length of edge 46 through tabs 47.

Articulated edge portion 53 of core 52 incorporates a plurality of squared or rectangular slots 54 adapted to snugly receive tabs 47. A plurality of colinear bores 55 extending along the length of edge 53 correspond with bores 48 to permit pin 57 to be positioned within bores 48 and 55 to, at least temporarily, mechanically secure connector section 45 to core section 52. It is to be noted that the use of pin 57, which is preferably made of a precious metal, and associated bores 48 is optional. The pinned connector section 45 and core section 52 are inserted into a precious metal sheath and hot isostatically pressed to intimately bond the connector section 45 and core section 52, which are mechanically interlocked along the mating articulated edges, and a precious metal sheath into an integral laminate by hot isostatic pressing.

Figure 7:
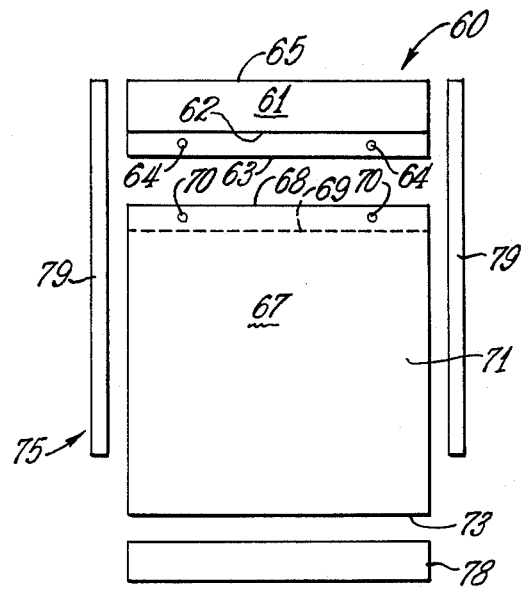
FIG. 7 is an exploded side view of the terminal shown in FIG. 6.

As shown in FIGS. 6 and 7, assembly 60 is comprised of connector section 61, core 67 and sheath 75. Articulated edge 62 has a tongue 63 extending along the length thereof. A plurality of bores 64 extend transversely through tongue 63. Opposite articulated edge 62, attachment edge 65 is adapted to be joined to body 11 of feeder 10.

Articulated edge 68 of core 67 is comprised of a groove 69 extending along the length thereof adapted to snugly receive tongue 63 of connector section 61. As shown, tongue 63 and groove 69 are substantially parallel to the major surfaces 71 and 72 of core 67. Bores 70, which extend through edge 68, are in registration with bores 64 to permit pins 81 to be pressed therein to secure section 61 to core 67. Again, the use of such pins and bores is optional.

The precious metal sheaths, such as sheath 75, may be fabricated from a plurality of precious metal parts. As shown, first precious metal layer 76 is positioned along first major surface 71 of core 67, and secure precious metal layer 77 is positioned along side of second major surface 72 of core 67. First and second layer 76 and 77 also extend over the top and bottom of connector section 61. Precious metal end trim 78 is positioned between first and second layers 76 and 77 along end 73 of core 67. Two pieces of lateral edge trim 79 are positioned between first and second layers 76 and 77 along the lateral edges of core 67 and connector section 61.

After assembly and hot isostatic pressing, connector section 61 is mechanically interlocked along the articulated edges and intimately or diffusion bonded to core 67. Also, sheath 75 is diffusion bonded to connector section 61 and core 67 to provide a unitary laminate capable of functioning in a high temperature, oxidizing environment as an electrical terminal for glass fiber forming feeders.

Figure 8:
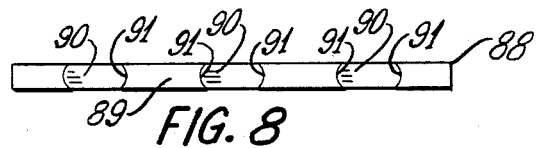
FIG. 8 is a side view of one of the refractory metal components, in an alternative form, according to the principles of this invention.
Figure 9:
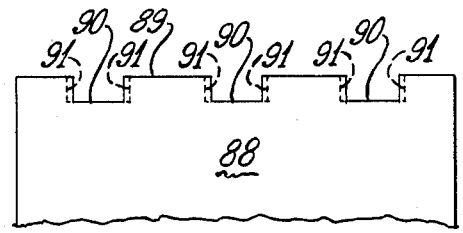
FIG. 9 is a bottom view of the component shown in FIG. 8.

FIGS. 8 and 9 show another alternative embodiment similar to the system shown in FIG. 5 wherein the core 88 includes a plurality of counterbored slots 90 to form articulated edge 89. As such, sides 91 of slots 90 are radiused or grooved to secure the connector section to core 88 against movement transverse to the major surfaces of core 88 as well as along the length of articulated edge 89. As such, sides 91 provide a plurality of laterally extending grooves.

It is to be understood that the mechanical interlocking features provided by the articulated edges of the components of the laminate along with the diffusion bonding provided by hot isostatic pressing, according to the principles of this invention, are also readily applicable to items other than terminals for fiber forming feeders. The present invention may find utility in a number of high temperature, oxidizing environments wherein portions of the laminate are subjected to excessive dynamic or static loadings that may otherwise cause the seams between the components of the laminate to separate.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple glass filaments.

We claim:

1. A feeder for supplying streams of molten glass to be drawn into filaments comprising:
   a body having an orificed discharge wall adapted to permit said molten glass to flow therethrough to provide said streams; and a terminal member joined to said body, said member being adapted to be connected to a source of electrical energy to heat said body, said terminal member being a laminate comprised of:
  (a) a refractory metal core having at least one articulated edge portion;
  (b) a oxygen impervious, precious metal connector section joined to said body, said connector section having an articulated edge portion mechanically interlocked with said articulated edge portion of said refractory metal core; and
  (c) an oxygen impervious, precious metal sheath positioned around said core and in contact with said connector section, said core, connector section and sheath being intimately bonded together by hot isostatic pressing to form a unitary laminate, wherein the connector section and sheath protect the core from oxidation at elevated temperatures.

2. The feeder of claim 1 wherein the articulated edge portion of the core has a plurality of slots oriented substantially perpendicular to a major surface of the core.

3. The feeder of claim 2 wherein said slots are dovetailed.

4. The feeder of claim 1 wherein the articulated edge portion of the core has a slot extending substantially parallel to a major surface of the core.

5. The feeder of claim 1 wherein the core is made from a material selected from the group consisting of Ti, V, Cb, Ta, Cr, Mo, W, Re and base alloys thereof and wherein said connector section and said sheath are made from materials selected from the group consisting of Pt, Pd, Ir, Os, Rh, Ru and base alloys thereof.

6. The feeder of claim 2 wherein the articulated edge portion of the core and articulated edge section of the connector section are adapted to receive at least one pin extending at least partially through said core and connector section.

7. The feeder of claim 2 wherein the articulated edge portion of the core has a plurality of laterally extending grooves.

8. A feeder for supplying streams of molten inorganic material to be drawn into filaments comprising:
  a body having an orificed discharge wall adapted to permit said molten glass to flow therethrough to provide said streams; and
  member joined to said body, said member being a laminate comprised of:
  (a) a plurality of sections of material wherein one of said sections is a refractory metal and another of said sections is an oxygen impervious, precious metal, said refractory metal section having at least one articulated portion, said precious metal section having an articulated portion adapted to mechanically interengage the articulated portion of the refractory metal section to establish opposed precious metal and refractory metal surfaces transversely oriented with respect to force applied to said member; and
  (b) a sheath having an oxygen impervious precious metal layer adapted to cooperate with said precious metal section to protect said refractory metal section at elevated temperatures, said plurality of sections and said sheath being intimately bonded together by the application of isostatic pressure and heat to form a unitary laminate.

* * * * *